United States Patent
Fan et al.

(10) Patent No.: US 8,455,048 B1
(45) Date of Patent: Jun. 4, 2013

(54) METHOD FOR MAKING NANOMATERIALS

(75) Inventors: Hongyou Fan, Albuquerque, NM (US); Huimeng Wu, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 322 days.

(21) Appl. No.: 12/880,886

(22) Filed: Sep. 13, 2010

Related U.S. Application Data

(60) Provisional application No. 61/315,270, filed on Mar. 18, 2010.

(51) Int. Cl.
*B05D 3/12* (2006.01)

(52) U.S. Cl.
USPC ............... 427/241; 427/240; 427/369

(58) Field of Classification Search
USPC .................. 427/240, 241, 369, 355
See application file for complete search history.

(56) References Cited

U.S. PATENT DOCUMENTS

| | | | |
|---|---|---|---|
| 8,092,595 B1 * | 1/2012 | Fan et al. ............ | 117/70 |
| 2008/0096293 A1 * | 4/2008 | Suhir et al. ............ | 438/14 |

OTHER PUBLICATIONS

Dong et al., "Pressure-induced morphology-dependent phase transformations of nanostructured tin dioxide," Chemical Physics Letters, 480, Aug. 2009, pp. 90-95.*
H. Wu, et al., Nanostructured Gold Architectures Formed through High Pressure-Driven Sintering of Spherical Nanoparticle Arrays, J Am Chem Soc. 2010. DOI: 10.1021/ja105255d.
H. Wu, et al., Pressure-Driven Assembly of Spherical Nanoparticles and Formation of 1D Nanostructure Arrays, Angew. Chem., 122, Int.Ed.2010. DOI:10.1002/ange.2010011581.
Wu, et al., Pressure-Driven Assembly of Spherical Nanoparticles and Formation of 1D Nanostructure Arrays, ACS Meeting Aug. 2010, Boston, MA.

* cited by examiner

*Primary Examiner* — Kirsten Jolley
(74) *Attorney, Agent, or Firm* — Kevin W. Bieg; Elmer A. Klauetter

(57) ABSTRACT

A method of making a nanostructure by preparing a face centered cubic-ordered metal nanoparticle film from metal nanoparticles, such as gold and silver nanoparticles, exerting a hydrostatic pressure upon the film at pressures of several gigapascals, followed by applying a non-hydrostatic stress perpendicularly at a pressure greater than approximately 10 GPA to form an array of nanowires with individual nanowires having a relatively uniform length, average diameter and density.

13 Claims, 8 Drawing Sheets

_US 8,455,048 B1_

METHOD FOR MAKING NANOMATERIALS

This application claims the benefit of U.S. Provisional Application No. 61/315,270, filed Mar. 18, 2010.

This invention was made with Government support under Contract No. DE-AC04-94AL85000 awarded by the Department of Energy. The Government has certain rights in the invention.

BACKGROUND OF THE INVENTION

The present invention relates to a method of making nanomaterials, and, in particular, to a method of transforming three-dimensional nanoparticle assemblies into one- and two-dimensional sintered nanostructural arrays using pressure.

Due to the size- and shape-dependent properties, nanoparticles have been successfully used as functional building blocks to fabricate multi-dimensional (D) ordered assemblies for the development of 'artificial solids' (e.g., metamaterials) with potential applications in nanoelectronic and optic devices. To date, fabrications of ordered nanoparticle assemblies have relied on specific interparticle chemical or physical interactions such as van der Weals interactions, dipole-dipole interaction, chemical reactions, and DNA-templating. The consequent self-assembly scenario is the formation of higher dimensional nanoparticle architectures from single nanoparticles.

DETAILED DESCRIPTION OF THE INVENTION

Figure 1:
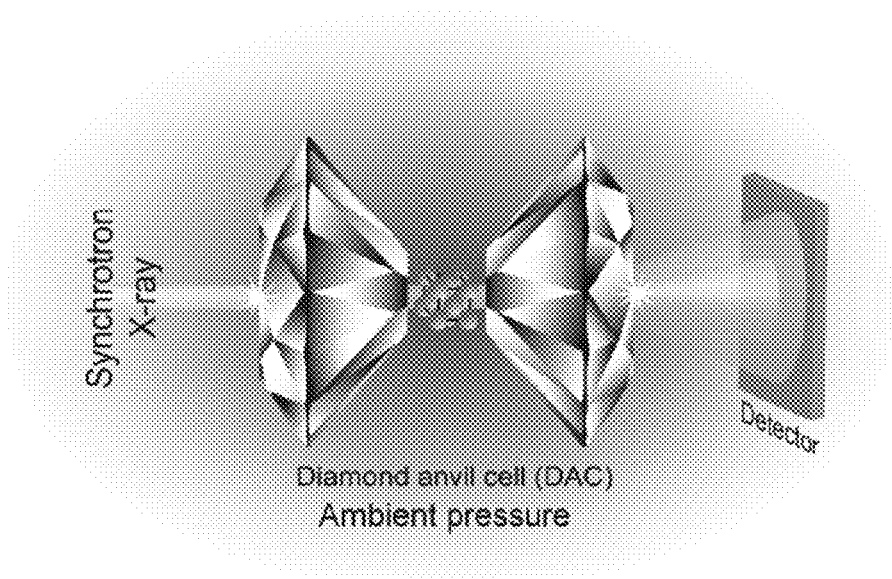
FIG. 1 is an illustration of a nanoparticle film loaded into a diamond anvil cell.

One embodiment of the present invention is an external pressure-induced engineering pathway to convert three-dimensional (3D) ordered spherical nanoparticle assemblies to one or two dimensional (1D or 2D) nanostructures and form ultrahigh density ordered nanostructure arrays. Ordered spherical gold or silver nanoparticle films with face-center cubic (fcc) mesophase are compressed, such as with a diamond anvil cell. In situ high-pressure small angle x-ray scattering measurements show that gradual elevation of external pressure from atmospheric pressure to 8.9 gigapascal (GPa) causes reversible shrinkage of interparticle spacing. Pressures between 8.9 GPa and 13 GPa drive the nanoparticles to coalesce, forming 1D nanostructures (nanorods or nanowires) and their ordered hexagonal arrays with p6mm symmetry. Dispersion of the ordered arrays in organic solvents results in uniform single nanostructures that can re-assemble into ordered arrays upon solvent evaporation. This method is a simple yet efficient nanoengineering process to tune nanoparticle assemblies and fabrications of new complex nanoparticle architectures.

External pressure provides an efficient process to engineer nanoparticle assemblies and to fabricate new complex nanoparticles architectures without relying on specific chemical and physical interaction. The reversible changes of the nanoparticle unit cell dimension under pressure allow precise control over interparticle separation in 2D or 3D nanoparticle assemblies. Under high pressure, the nanoparticles start to sinter. The initial nanoparticle assembly framework (including orientations, dimensions) is crucial for the nanoparticle phase transformation and formation of complex nanostructures. The mechanical flexibility of polymer matrices provides sufficient compressibility to maintain the ordered mesophase and the favorable orientation while the unit cell dimension shrinks.

Spherical metal nanoparticles were synthesized using a standard one-phase method. The metals used were gold and silver. The gold nanoparticles formed had an average diameter of 5.2 nm with a standard deviation of 4.2%. Silver nanoparticles formed also had an average diameter of approximately 5 nm. The fcc ordered gold or silver nanoparticle polymer films were fabricated through a solvent evaporation process on silicon wafers. In this process, gold (or silver) nanoparticles (approximately 80 mg) and 20 mg of polystyrene with a molecular weight of 1.7 k were dissolved in 1 mL of a solvent such as toluene. Alternatively, poly (methyl methacrylate) (PMMA) was used as the matrix instead of polystyrene. Ordered nanoparticle films were formed upon solvent evaporation by spin-coating or casting on silicon wafers.

At a high spin rate (2000 rpm), the nanoparticle films were formed with thin thickness (0.4~1.5 µm). A piece of the nanoparticle film (about 100×150 µm) was freed from the substrate and loaded directly into a diamond anvil cell (DAC) for in situ pressure measurement. Two gem-quality diamond anvils with a culet size of 500 µm were aligned to generate pressure. A stainless-steel gasket was pre-indented, and the thickness reduces from 250 µm down to 70 µm. A 250-µm-diameter hole was drilled and serves as the sample chamber. Silicone oil was used as the pressure transmitting fluid. The pressure in the diamond cell was determined using a standard pressure-dependent ruby fluorescent method. Upon pressure release from 9.4 GPa, the sample was carefully removed from the gasket and cleaned by a small amount of solvents (for example, ethanol, toluene, and hexane).

Figure 2:
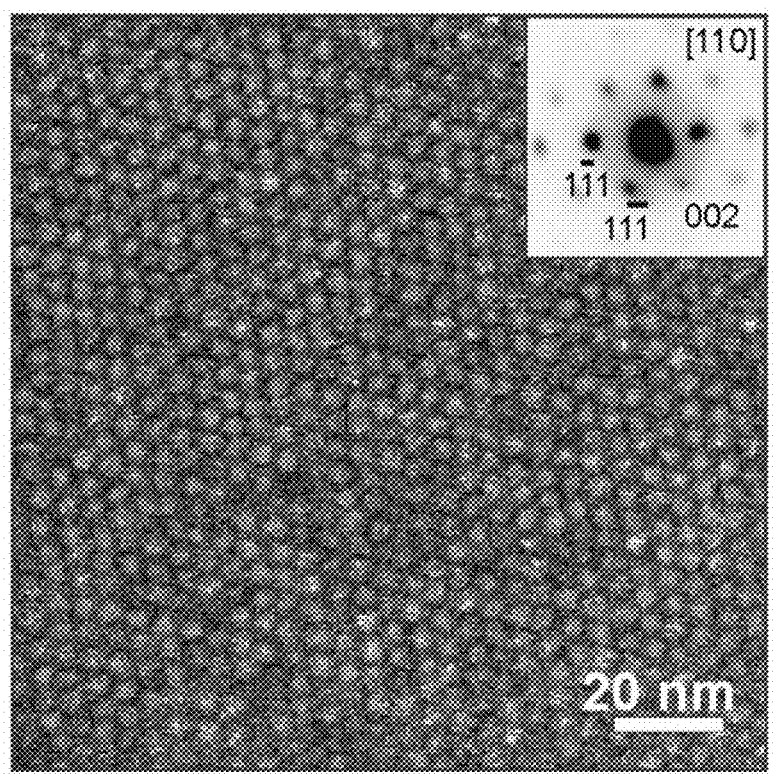
FIG. 2 shows a scanning electron microscope (SEM) image of [110] orientation of an ordered gold nanoparticle film.
Figure 3:
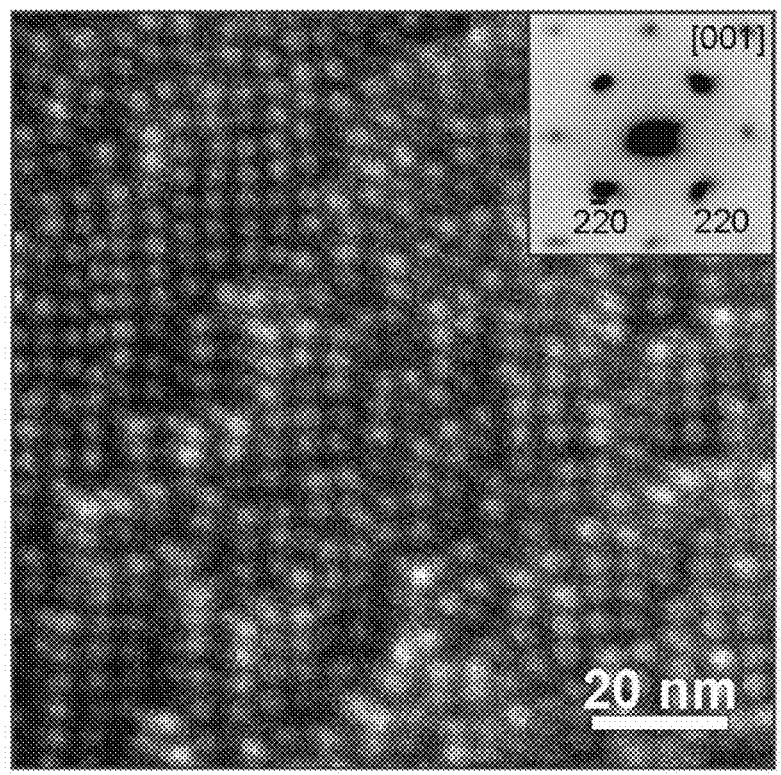
FIG. 3 shows a cross-sectional SEM image of an ordered gold nanoparticle film.

In one embodiment, at a low spin rate (500 rpm), the nanoparticle films were formed with thick thickness. The resultant gold nanoparticles film had an fcc assembled structure with the [110] direction parallel to the substrate. Upon loading of the ordered nanoparticle film into the diamond anvil cell (DAC) (see FIG. 1), the film maintains the fcc mesophase and exhibits [110]-orientation confirmed by small angle synchrotron x-ray scattering (SAXS) and microscope measurement. The SAXS pattern and integrated spectrum collected at ambient pressure indicate a pattern specific to face-center cubic (fcc) mesophase with Fm$\bar{3}$m space group. The nanoparticle assembly exhibits preferred packing orientation with [110] direction parallel to the substrate, thus vertical to the beam line. The unit cell parameter a was calculated to be 104.0 Å. Representative scanning electron microscope (SEM) images (FIGS. 2 and 3) taken from the surface and cross-section of the gold nanoparticle film revealed that the film consists of 3D ordered arrays. Both electron diffraction pattern and fast-Fourier transform analyses confirmed that gold nanoparticles are organized in a periodic, ordered fcc mesophase with a preferred orientation along [110] direction.

The nanoparticle film was gradually compressed in the diamond anvil cell from ambient pressure to 13 GPa and gradually released back to ambient pressure at room temperature. The SAXS pattern and integrated spectrum obtained are consistent with a 2D hexagonal mesophase with p6mm symmetry. The primary peaks are assigned as 100, 110, 200, 210, and 300 reflections. Representative electron microscopic images of the samples after the pressure is released from 13 GPa to ambient pressure show that the ordered fcc spherical nanoparticle superlattice has been converted to an ordered nanowire array. The gold nanowire array consists of individual gold nanowires with hexagonal close packing. Representative SEM images of [100]- and [110]-oriented nanowire mesophases along with their corresponding electron diffraction patterns are consistent with a unit cell with lattice parameter $a_{hex}$=81.4 Å and a uniform, minimum center-to-center spacing between nanowires of 8.1 nm. Based on the packing geometry, this corresponds to an ultrahigh nanowire density of approximately $1.7 \times 10^{12}$ nanowires per square centimeter. As shown in obtained SEM images, the two end facets of the nanowire bundles are very flat, suggesting a constant length of nanowires. Single nanowires can be obtained by dispersion of the nanowire arrays in organic solvents (for example, toluene). TEM image of the nanowires also show that the nanowires are uniform in diameter and length. The average diameter is 6.1 nm with a standard deviation of 4.6%. The length is consistent with the distance between the two end faces, ranging from 400 nm to 1.5 μm depending on the initial film thickness of the ordered nanoparticles. For the thin film, short nanowires (or nanorods) are obtained. High-resolution TEM imaging reveals that the gold nanowires are polycrystalline. Along the c-axis, each nanowire consists of crystalline nanodomains whose size is close to that of original spherical gold nanoparticles. This indicates that the formation of gold nanowires occurs through sintering of spherical gold nanoparticles to form nanowire c-axis, which was further confirmed by TEM studies. By sintering, it is meant that the nanowires formed are a coherent bonded mass formed by the nanoparticles without interspersed organic materials. These individual nanowires can form stable colloidal dispersions in organic solvents and re-assemble into ordered arrays upon solvent evaporation. Overall, the method of the present invention provides greater control over both the uniform length of nanowires and the formation of ordered, ultrahigh density of nanowire arrays in comparison with chemical methods.

In another embodiment, 80 mg of nanoparticles and 20 mg of polystyrene with a molecular weight of 2M were dissolved in 1 mL of toluene. At a spin rate (2000 rpm), the nanoparticle films were formed with a thin thickness. The resultant gold nanoparticles film has an fcc assembled structure with the [111] direction parallel to the substrate. Then a similar process was carried out as in the prior described embodiment. The nanoparticle film was gradually compressed in the DAC from ambient pressure to 13 GPa and gradually released back to ambient pressure at room temperature. Another embodiment used the same parameters except a spin rate of 500 rpm was used, obtaining similar results.

Figure 4:
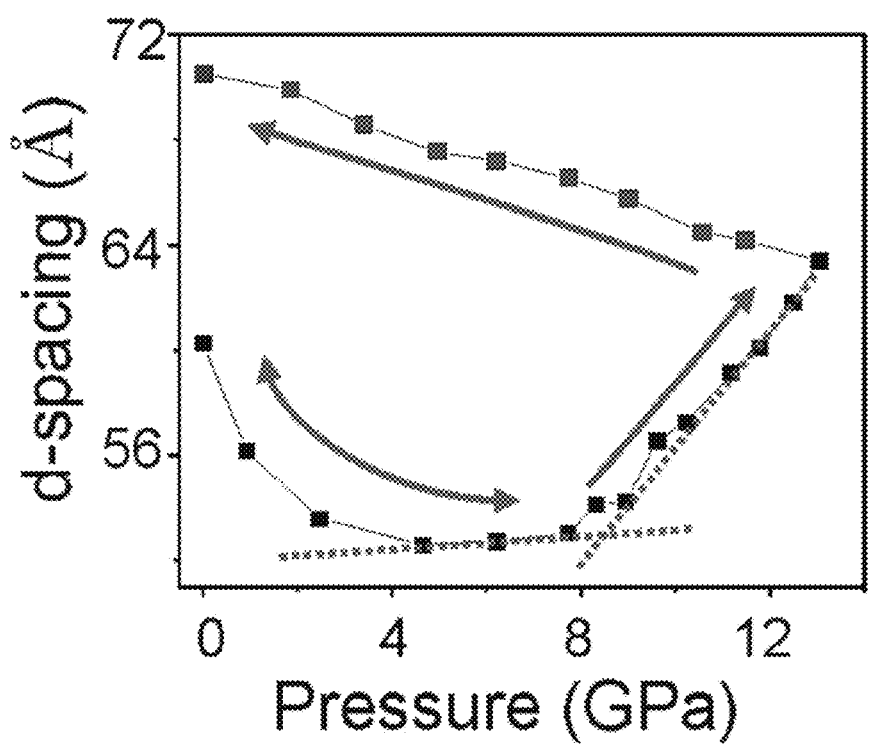
FIG. 4 illustrates the d-spacing changes as a function of pressure.
Figure 5:
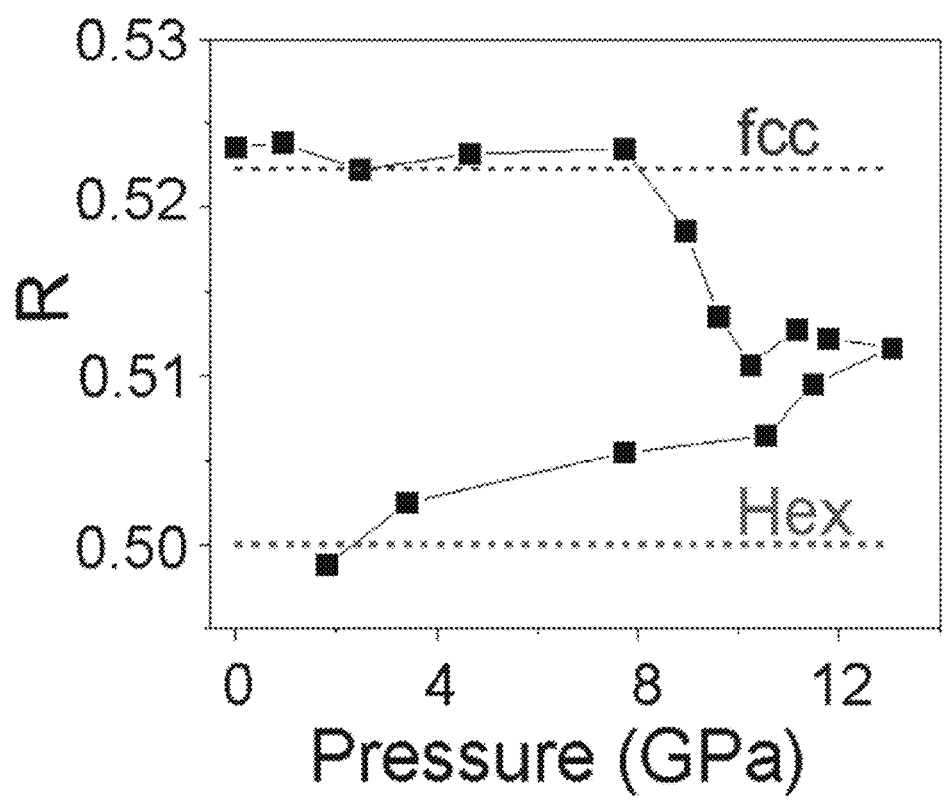
FIG. 5 illustrates the d-spacing ratios as a function of pressure.

To investigate the nanoparticle assembly pathway and the nanowire formation process, in situ high-pressure small angle scattering (HP-SAXS) experiments were performed to follow the structure evolution of the nanoparticle films during the compression and release processes. The HP-SAXS results suggest the formation of gold nanowire arrays via phase transformation from 3D fcc mesophase to 2D hexagonal nanowire mesophase. Before formation of gold nanowires, the spherical nanoparticle mesophase exhibits reversible unit cell dimension shrinkage. During this reversible process, the interparticle separation dimension can be precisely controlled by external pressure. Representative HP-SAXS patterns were collected at varied compression and release pressures. At ambient pressure, the gold nanoparticle film exhibits fcc mesophase. In the range from ambient pressure to 8.9 GPa, HP-SAXS data indicate that the gold nanoparticle assembly remains in the fcc structure and [110]-orientation. As the pressure increases to 8.9 GPa, all the HP-SAXS peaks shift slightly to higher 20 (lower d-spacing), indicating shrinkage in the unit cell dimension. When the pressure is gradually released, all peaks return to their starting positions. Thus, the change of the unit cell dimension is reversible between ambient pressure and 8.9 GPa. This reversible behavior is further verified on the d-spacing changes (FIG. 4) and the constancy of the d-spacing ratio R (FIG. 5) at varied pressures: Below 8.9 GPa, R stays constant and close to the theoretical value of $R = d_{311}/d_{111} = \sqrt{3/11} = 0.522$ for an fcc mesophase; The lattice constant shrinks from 104 Å at ambient pressure to 91 Å at 8.9 GPa and returns to 103 Å when the pressure is completely released. Consequently, the interparticle separation distance along [110] direction varies reversibly between 74 Å and 64 Å. Below 8.9 GPa, the nanoparticles are not connected. This is evidenced by the fact that the closest center-to-center particle distance is 64.4 Å at 7.7 GPa, slightly larger than the diameter of 5.2 nm of the gold nanoparticle.

The nanoparticle assembly exhibits an intermediate structure that cannot be assigned as either fcc or 2D hexagonal during the course of increasing the hydrostatic pressure to 8.9 GPa, increasing the pressure non-hydrostatically to 13 GPa, and then decreasing the pressure to 7.7 GPa. The unit cell dimension changes are irreversible during this pressure course. HP-SAXS data show that all the peaks shift to lower 20 (higher d-spacing), rather than a continuous shift to lower d-spacing. This suggests that a structure transformation has taken place. More importantly, the d-spacing ratio R moves away from the theoretical value of 0.522 down to approximately 0.51, further confirming a structural transformation. When the pressure is released to 7.7 GPa, all the HP-SAXS peaks continue to shift to lower 28 instead of reversibly returning to their original positions. Below 7.7 GPa, the d-spacing ratio further decreases down to approximately 0.5, the theoretical $d_{200}/d_{100}$ ratio for 2D hexagonal mesophase. In addition, the HP-SAXS patterns are consistent with 2D hexagonal mesophase.

Figure 6:
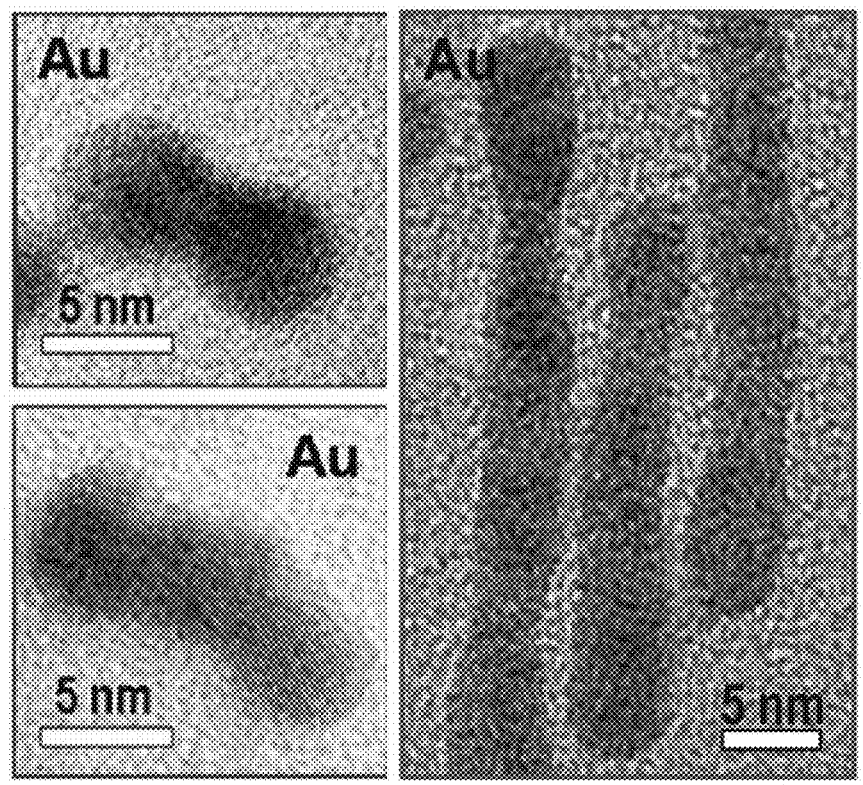
FIG. 6 shows representative transmission electron microscopy (TEM) images of sintered gold nanoparticles.
Figure 7:
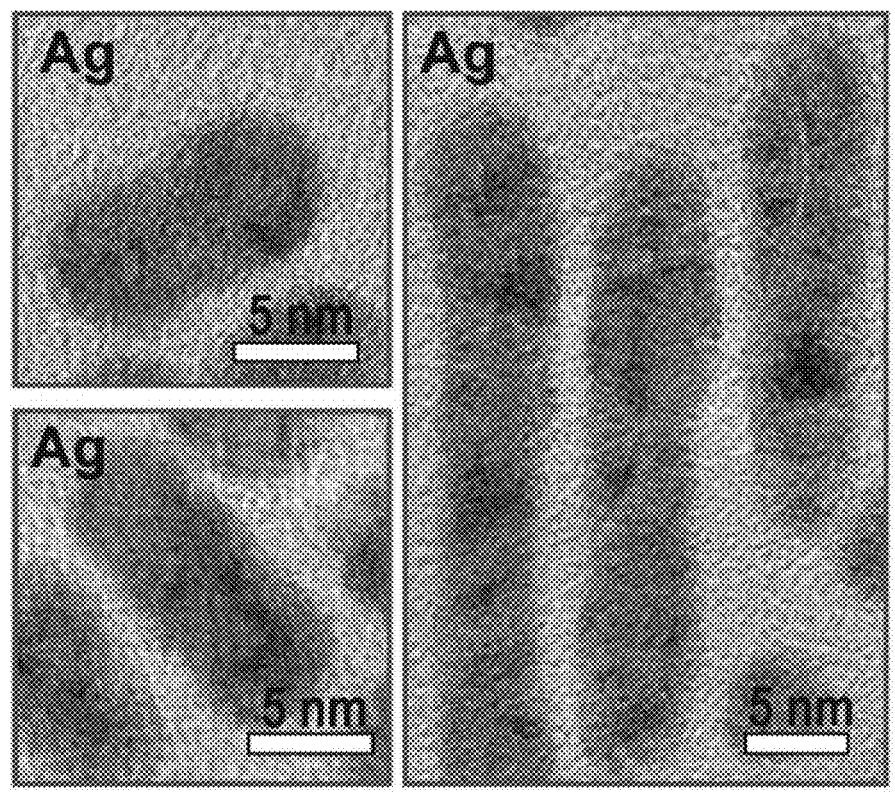
FIG. 7 shows representative TEM images of sintered silver nanoparticles.

In addition to in situ HP-SAXS, TEM experiments were performed to follow the nanostructure changes. The TEM results further confirm that the gold nanowires are formed through spherical nanoparticle sintering. Upon exposure to pressures above 8.9 GPa, the formation of numerous gold nanoparticle dimers, trimers, and nanorods was observed (FIG. 6). High-resolution TEM images, shown in FIG. 6, indicate that the nanoparticles seamlessly sinter together along the nanowire c-axis, which distinguished them from previously reported 1D nanoparticle nanostructures in which the nanoparticles are connected through organic ligands that are chemically bonded to each neighboring nanoparticle. TEM images indicate that gold nanoparticles sinter after applied pressures greater than 8.9 GPa. Continuous compression along [110] up to 13 GPa leads to the formation of nanorods and nanowires. Based on this understanding, the formation of other 1D metal nanostructures, such as 1D Ag nanostructures (FIG. 7), were formulated by extending this approach to compress films of spherical Ag nanoparticle films. It is noted that oriented sintering under high pressure slightly increases the diameter of the final 1D nanostructures in comparison with the original nanoparticles.

Liquid silicone oil was used as the pressure-transmitting medium. In general, it is capable of maintaining a hydrostatic environment of loaded samples to pressure as high as approximately 9-10 GPa. Above this threshold, generation of deviatoric stress results in a pressure gradient vertically across the sample. This nonhydrostatic stress can be evaluated through quantitative texture analysis by unraveling 2D HP-SAXS patterns (Debye-Scherrer rings) into Cartesian (cake) plots of azimuthal angle as a function of 2θ. There is an evident waviness at pressure above 8.9 GPa, indicative of the generation of a nonhydrostatic stress field during compression of the nanoparticle film.

Figure 8:
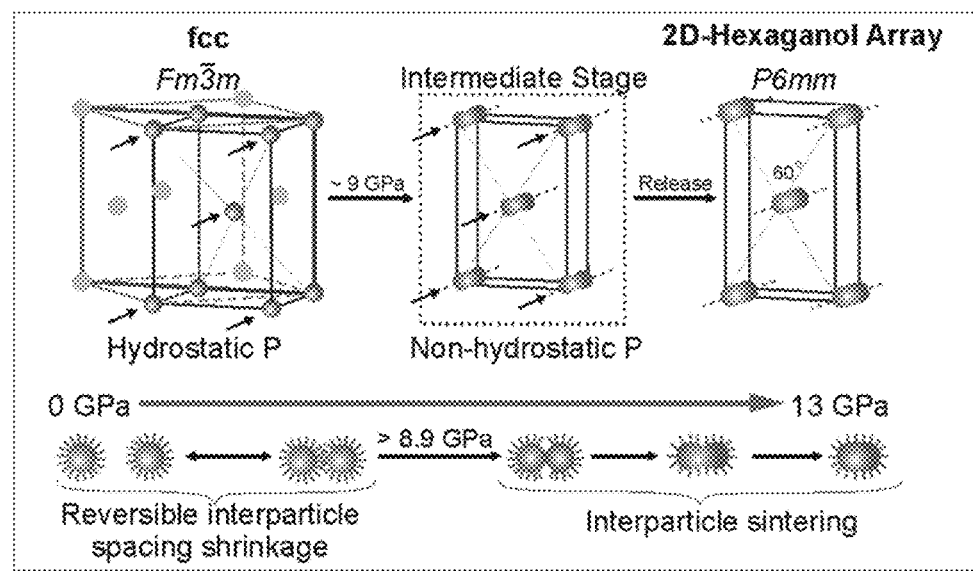
FIG. 8 is a schematic illustration showing the orientated sintering of metal nanoparticles into metal nanowire/nanorods arrays along the [110]-direction under compression.

Based on these experimental results, the formation of well-ordered 1D metallic nanostructures and their order arrays can be understood as follows (FIG. 8): below 8.9 GPa, the sample is compressed under a hydrostatic pressure field. The isotropic pressure applied uniformly through all directions to the nanoparticle assembly causes the fcc unit cell dimension to shrink uniformly. The fcc mesophase and its [110] orientation are retained. For pressures above 8.9 GPa, a nonhydrostatic stress is generated and applied perpendicularly to the nanoparticle film. Due to the [110]-orientation of the nanoparticle mesophase, nanoparticles along [110] direction receive much greater stress than other crystallographic directions. Thus, the nanoparticle sintering preferentially occurs along [110] direction. Continuous compression to 13 GPa drives the spherical nanoparticles to touch and finally sinter into 1D nanostructures (nanorods and nanowires) along the [110] direction. Ultimately, bundles (or arrays) of well-oriented nanowires with the c-axis along the former fcc [110] direction are formed.

In addition to the favorable orientation, it is noted that the initial nanoparticle assembly framework is crucial for the nanoparticle phase transformation and formation of nanowires. The mechanical flexibility of polystyrene matrices provides sufficient compressibility to maintain the ordered fcc mesophase and the favorable orientation while the unit cell dimension shrinks. In a pure gold nanoparticle fcc mesophase formed without using polystyrene matrices, we do not observe the formation of nanowires. This may be due to the collapse of the fcc nanoparticle mesophase under high pressure. Furthermore, in an ordered gold nanoparticle/silica fcc mesophase, nanowires could not be obtained either. This may be because the rigid, condensed silica layer between gold nanoparticles prevents adjacent nanoparticles from sintering.

The method of the present invention provides a pressure-induced phase transformation process to engineer nanoparticle architectures and to fabricate new nanostructured materials. The reversible changes of the nanoparticle unit cell dimension under pressure allow precise control over interparticle separation in 2D or 3D nanoparticle assemblies, offering unique robustness for interrogation of both quantum and classic coupling interactions. The fundamental understanding of nanoparticle assembly under pressure provides useful insight for material integration through pressure-driven nanofabrication processes.

The invention being thus described, it will be apparent to those skilled in the art that the same may be varied. Such, variations are not to be regarded as a departure from the spirit and scope of the invention, and all such modifications are intended to be included within the scope of the following claims.

We claim:

1. A method of making a nanostructure, comprising:
   preparing a face centered cubic-ordered metal nanoparticle film, wherein said metal is selected from the group consisting of gold and silver,
   exerting a hydrostatic pressure upon said film up to a pressure of approximately 8.9 GPa, and
   subsequently applying a non-hydrostatic stress perpendicularly to form an array of nanowires.

2. The method of claim 1 wherein said array of nanowires is dispersed in an organic solvent to form individual nanowires.

3. The method of claim 1 wherein said preparing a face centered cubic-ordered metal nanoparticle film occurs by mixing metal nanoparticles and a matrix material selected from the group consisting of polystyrene and poly(methyl methacrylate) in a polar solvent and subsequently evaporating said polar organic solvent by a process selected from the group consisting of spin-coating and casting.

4. The method of claim 1 wherein said non-hydrostatic stress is a pressure of up to 13 GPa.

5. The method of claim 4 wherein said pressure is subsequently decreased to ambient pressure at ambient temperature.

6. The method of claim 2 wherein said nanowires are formed without interspersed organic materials.

7. The method of claim 1 wherein said array of nanowires has a density of approximately $1.7 \times 10^{12}$ nanowires per square centimeter.

8. The method of claim 2 wherein said nanowires have an average diameter of approximately 6 nm.

9. The method of claim 2 wherein said nanowires have a length ranging from 400 nm to 1.5 μm.

10. The method of claim 2 wherein said organic solvent is toluene.

11. The method of claim 1 wherein a diamond anvil cell is used to exert said hydrostatic pressure.

12. The method of claim 1 wherein the hydrostatic pressure is exerted upon said film at ambient temperature.

13. The method of claim 3 wherein said metal nanoparticles have an average diameter of approximately 5 nm.

* * * * *